3,111,418
METHOD AND APPARATUS FOR TREATING PLASTIC PACKAGING MATERIALS AND ARTICLES PREPARED THEREBY
Seymour G. Gilbert, Milwaukee, and James I. Mergy, Wauwatosa, Wis., assignors to Milprint, Inc., Milwaukee, Wis., a corporation of Delaware
Filed Oct. 28, 1959, Ser. No. 849,379
9 Claims. (Cl. 117—15)

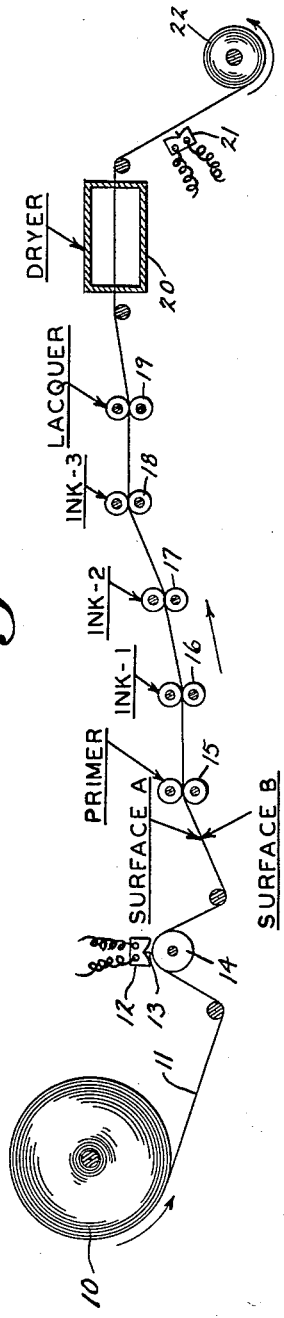
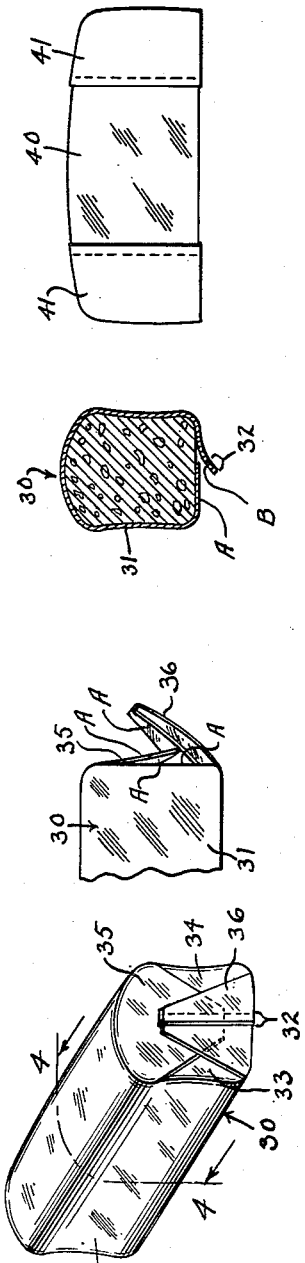
Fig. 1
Fig. 2
Fig. 3
Fig. 4
Fig. 5
INVENTORS
SEYMOUR G. GILBERT
JAMES I. MERGY
BY
ATTORNEY … Patented Nov. 19, 1963

The present invention relates generally to the art of packaging diverse commodities, and relates more particularly to the treatment of commodity wrapping materials to effect improved sealing characteristics.

It is well accepted that polyolefin packaging materials, such as low and medium density polyethylene and polypropylene films, are very desirable for use in the packaging industry to provide attractive and useful transparent or partially transparent containers for enwrapped items, including bread and like commodities. It will be appreciated, however, that commodities, such as bread, are relatively soft and do not provide firm supporting surfaces during heat sealing of film wrapper margins or end folds to one another. Another factor which must be considered in determining proper sealing techniques, is that it is very often desirable to print trademark indicia and/or decorative areas directly upon the wrapper surface, and in certain cases, to apply a printing ink for masking certain portions of an otherwise transparent wrapper. In the past, printing of polyolefin wrappers has been a vexatious source of trouble, as the ink tends to interfere with conventional wrapper sealing techniques. Another factor that has been quite troublesome, especially in the case of bread wrapping, has been that certain areas (in particular, the remote ends of the wrapped package) comprise layers of varying fold thickness which interfere with and affect uniform heat transmission from the source of sealing energy to the more remote fold surface areas. It will be appreciated that in order to provide an adequate seal to the innermost fold surfaces, the surfaces closer to the source of heat are often deleteriously affected by the relatively intense heat. Wrappers of polyethylene film, wherein the melting temperature of the film is relatively low, being in the neighborhood of 200-250° F., often exhibit an actual blistering or rupture of the film. If the temperature is not closely controlled, the areas of single ply film will be burned through to expose the otherwise protected commodity, thereby destroying the very function of the protective wrapper.

In many cases manufacturers have provided a two-piece commodity wrapper, wherein a separately printed insert band is placed within the transparent wrapper for exposure of the printed area therethrough. Obviously, such an arrangement has a number of disadvantages including the requirement of separate inventory and shipping of bands, and in some cases, the requirement of having separate sources of supply. There is, therefore, an obvious advantage in providing a single sheet wrapper which has printed matter applied directly thereto.

It has also been the common practice in the packaging field to utilize films which have varying degrees of transparency, such as regenerated cellulose films, rubber hydrochloride, "Saran" and certain vinyl and nylon films. While at least some of these films can be produced with desired transparency characteristics, they are either lacking in other desired qualities, are economically unfeasible, or they have not heretofore been successfully adapted to rapid and automatic fabrication and ready opening.

For example, commercially available cellophane or regenerated cellulose is clear and highly transparent, may be rendered receptive to printing by modern methods, and automatic packaging machinery has been developed for wrapping commodities therein; however, this film is relatively expensive, has a hard texture and cold feel or touch qualities, is also subject to deterioration under certain conditions, and does not itself possess the best possible protective qualities. It will thus be apparent that, from an economic standpoint and from the standpoint of transparency and attractiveness, and mainly from the view of providing a good moisture-proof barrier, it is desirable to utilize plastic films of polyolefin base, such as low or medium density polyethylene and polypropylene. These films are of soft texture and are pliable, thereby permitting the customer the opportunity of actually feeling the texture of bread to determine whether it is fresh—a practice which is quite common.

It is an object of the present invention to provide an improved plastic film suitable for wrapping purposes, and method of treating the same for improving heat sealing characteristics of the film and anchorage of printing inks to the film, without affecting the said sealing characteristics.

It is another object of the present invention to provide an improved plastic commodity wrapper and a method of improving the said wrapper by treatment of one or both of its exposed surfaces to improve its sealing characteristics.

It is a further object of the present invention to provide an improved commodity wrapper of a polyolefin material and a method of treating the said material for improving its sealing characteristics.

It is still another object of the present invention to provide a polyethylene or other polyolefin film wrapper for a commodity, such as bread, wherein the said wrapper surface is treated to provide improved heat sealing characteristics and which may be printed with matter applied directly thereto without interfering with the improved seal.

A still further object of the present invention is to provide a wrapper for bread and the method of treating said wrapper for improving its heat sealing characteristics, and which wrapper may be sealed on conventional bread wrapping machines without additional attachments, and which may be sealed at each fold thickness without requiring special control techniques for preventing rupturing or blistering of single layers in the proximity of the source of heat.

Still another object of the present invention is the provision of an enwrapped commodity including a wrapper having a polyolefin base treated to provide improved heat seals of overlapping margins and end folds and which may also include printed matter applied directly thereto and in the sealing areas without interference with the said seals.

A specific object of this invention lies in the provision of a two-side treatment of a web of polyolefine material for enhanced heat sealing and printing characteristics, wherein the film is treated in line on a conventional printing machine.

These and other objects and advantages will become apparent from the following detailed description taken in connection with the drawing in which:

FIG. 1 is a diagrammatic view illustrating certain steps of the method of treating a plastic web in accordance with the practice of the present invention;

FIG. 2 is a perspective view of a commodity, such as a loaf of bread, enwrapped with material treated in accordance with the method of the present invention;

FIG. 3 is a fragmentary sectional view taken along the lines 3—3 of FIG. 1 and particularly illustrating the sealing relationship between mating surfaces in the plane of said section;

FIG. 4 is a fragmentary side elevational view of the end of a package such as that illustrated in FIG. 2 with the flaps or folds being shown prior to being sealed; and FIG. 5 is a side elevational view of a loaf of bread packaged with a wrapper treated in accordance with the present method and illustrative of another packaging embodiment.

The practice of the present invention is most graphically illustrated with reference to the diagram of FIG. 1, wherein a roll 10 of commercially available polyolefin film, such as a low density polyetheylene with one side normally treated for receiving printing ink, is fed into a conventional printing press modified slightly to embody the various stages of the present invention. The web 11 of the commercially received roll 10 is subjected, at preferably the untreated side thereof (surface A), to either flame or high voltage treatment at station 12, but it is within the province of this invention to overtreat the normally treated side (surface B) prior to printing, if so desired. In addition, the present invention contemplates treatment of one or both sides of untreated film. Surface treatment techniques have heretofore been used to provide a means of affecting chemical changes in the exposed surfaces of the plastic film for purposes of providing improved anchorage for printing inks. Untreated film could be either simultaneously or sequentially treated on both sides.

If a flame is to be used for treatment purposes, it is preferable to provide an oxidizing type flame directed onto the surface to be treated as the opposite surface is cooled to maintain the material of the article below temperatures affecting its strength characteristics. If electrical energy is to be used, a field of between 5000 and 7500 volts is preferably established between the treating electrodes across the area to be treated. The exact mechanics of the treatment and its chemical nature are not precisely understood, but it is believed that in both the flame and electrical type treatments there is an increase of unsaturated linkages in the surface molecules of the film, and that these unsaturated linkages are oxidized under the influence of the flame, or perhaps the production of ozone occurring during a corona discharge during electrical treatment, with the formation of polar groups, such as peroxides, oxides and carbonyl groups to render the surface more receptive to printing inks and to provide an increased number of "active adhesive sites" for improved adhesive characteristics, as will later be explained. Flame or electrical surface treatment also apparently results in removal of hydrogen from the carbon atoms along the chain and in the formation of double carbon-to-carbon bonds, or resulting in a cross linkage.

For purposes of illustration, surface A of the web 11 will eventually be used as the outside layer of the enwrapped commodity. The surface treatment according to either method would appear, for all intents and purposes, to provide a result that would be properly described as oxidation. In particular, an "electronic" type electrical treatment suitable for use in the preparation of film surfaces in accordance with the teachings of this invention utilizes a commercially supplied Mancib-type treater operated at higher power input level than the usual level necessary for merely providing ink adhesion, without concern for adequate seal strength characteristics, as desired in the present instance. The higher input power level is useful in obtaining a heavier or a deeper degree of treatment to provide required adhesive strength, as well as adequate ink adhesion. Certain suitable settings for the treater are as follows:

Primary circuit_____ 150-250 volts, 2 amperes/linear feet of treating electrodes.
Secondary circuit_____ 5000-7500 volts at a frequency of 2500 cycles/second.
Electrode gap setting____ 0.025-0.050 inch.
Web temperature_____ 125°-175° F.

When the treater 12 is operating properly, a brilliant violet corona discharge is visible where the web 11 passes through the gap between a knife-edged electrode 13 and a Mylar-covered steel backup roll 14. For this reason, this method of treatment is occasionally referred to as the corona discharge method.

With further reference to the diagram of FIG. 1, it is desirable to prime the previously treated surface at station 15, although at times the hereinafter described lacquer coating may be applied directly to a treated, unprimed surface. However, when a primer is applied, ink adhesion is materially improved, in addition to the provision of improved heat sealing. Priming also tends to compensate for problems that might occur if there has been insufficient flame or electrical treatment. Thus, a primer coating will insure that there will be an adequate number of available "active adhesive sites" for inherent high seal strength. The particular primer found suitable as an adhesion-promoting material is that having a base of polyethylene imine or, if desired, an organic titanium compound. Polyethylene imine is known to be effective as a primer to promote adhesion of extruded polyethylene to base sheets of other materials. The application of an imine primer seems to adhere somewhat to the established theory involving the oxidation of the surface molecules of the polyethylene by the heating or electrical treatment, in that the primer provides additional adhesive qualities over and above those of a lacquer, when applied directly to a treated surface. It is thought that the imine primer bridges, by means of chemical bonding, the areas which may have not been activated by the previously treated areas, to thus fill in the gaps between active sites, providing an overall adhesively active surface for thorough bonding with the later applied lacquer. The primer may be applied by means of conventional mating rollers at station 15.

Upon leaving the primer station 15, the webs 11 may next be printed on side A by means of the usual printing rollers 16, 17 and 18, by way of example, for three-colored printing, wherein each pair of rollers applies its separate color. In investigating the various inks ordinarily adapted for use with polyethylene film, it was found that an ink having a Versamid base, known commercially as "Permagloss" works the best, whereas an acetate base ink will work, but tends to "block," and thereby cause the printed layers to stick to one another. Versamid is a condensation product of dimerized and trimerized unsaturated fatty acids of vegetable oils with ethylene diamine. The usual acrylic base inks, though acceptable for ink anchorage, have been found to be unacceptable when a good sealing surface is required.

After being printed, the web 11 is next subjected to the application of a lacquer at station 19, where the previously treated, primed and printed surface A may be coated with a lacquer of a preferred composition, as follows:

| | Amount, parts by weight |
|---|---|
| Active materials: | |
| Versamid 940 | 43.0 |
| Nitrocellulose | 24.0 |
| Santicizer 141 | 8.0 |
| Armid HT | 0.5 |
| Solvents: | |
| N-propyl acetate | 7.0 |
| Benzosol | 4.0 |
| Isopropyl alcohol | 13.5 |

It should be recalled that lacquer ingredients are preferably selected as being non-toxic, suitable for use in connection with edible commodities. As far as can be determined, the ingredients of the various commercially obtained lacquer components are as follows:

Armid HT_____ Hexadecanamide, 22%; octadecanamide, 75%; 9-octadecenamide, 3%.
Nitrocellulose_____ Has 35% solids in 2B alcohol; ¼ sec., S.S.

Santicizer 141_____ Is 2-ethylhexyl diphenyl phosphate.

Versamid 940_____ Condensation product of dimerized and trimerized unsaturated fatty acids of vegetable oils with ethylene diamine; molecular weight: 3000 to 9000.

Experimentation in formula selection indicates that the lower the Armid concentration, the higher the possible seal strength conversant with blocking requirements. It is particularly to be noted that the selection of ingredients provides a lacquer of lower sealing temperature than the melting temperature of the polyethylene to which it is applied.

The next step in the procedure for treating the web 11 is to pass the lacquered material through a dryer 20 of conventional design. While the material is still warm from the dryer 20, it is preferably again passed through either a flame or electric surface treater 21, but this time it is applied to the opposite surface B of the web 11. Thus, the surface B will now be provided with additional "active adhesive sites" with inherent sealing ability when placed in contact with the lacquered surface A for later heat sealing, as will be hereinafter described. The treated and printed web 11 is then allowed to cool and rewound on a roll 22 for shipment to the consumer for use in packaging a desired commodity.

Attention is now directed to FIGS. 2–4, wherein both the problems and solution to adequate sealing of a commodity wrapper will next be discussed. It will be apparent from FIG. 2 that the present invention will have ready application in sealing conventional bread wrappers. The commodity, shown here as a loaf of bread 30 is enwrapped with a wrapper 31, cut from the web 11, which web was prepared in accordance with the techniques described in connection with the diagram of FIG. 1. The conventional sealing technique for bread loaves provides a bottom seal along the longitudinal dimension of the loaf, as indicated at 32. The end or side seals provide four folds, whereby the portions 33 and 34 are first folded inwardly by mechanical means (not shown) and the portion 35 is then folded thereover, and the fourth fold is provided by folding portion 36 thereover. It will be apparent that such construction provides a double layer at the bottom seal portion 32, a single layer at the portions 33 and 34, and double layers at the portions 35 and 36, whereas four and even five layers of folded materials may be provided in the overlap portion defined by the flaps 35 and 36, and including the overlap portion of the bottom seal 32, extending laterally from opposite ends of the bread loaf. It will be readily apparent that under conventional techniques a very fine control of applied pressure and heat is required to provide an adequate seal between each of the multiple folds having four and five layers, while carefully preventing burning, blistering or rupture of the relatively thin single and double layer folds.

The preparation of the plastic film surface, as well as the selection of the lacquer, provides the necessary tack seal at a sufficiently lower temperature than the softening temperature of the base sheet. When such tack seal has been provided, the dwell period may be materially shortened to prevent deleterious effect upon the film.

It will be further apparent from FIGS. 3 and 4 that there are other considerations than merely the heat problem. FIG. 3 illustrates the relationship of the end fold surfaces, wherein sealing takes place mostly between the outer surfaces A of the various folds with little or no contact between an inner surface B and an outer surface A which would be more conducive to sealing. In addition, the bottom seal 32, as shown in FIG. 4, involves the sealing of outer surface A of the wrapper 31 with the inner surface B.

Obviously, the best sealing characteristics occur between opposed flame or electrically treated surfaces, each of which has been primed and lacquered. However, we have found that adequate seal strength can be obtained by lacquering one side only, which may be readily observed from the chart of Table I following hereinbelow.

As stated previously, the preferred embodiment, as discussed in connection with FIG. 1, provides the lacquer coating to the outside surface A only, with the consequent advantages of being easy to print on a regular press; the fourth fold at each end is anchored and completely sealed without end labels; and such procedure avoids all chemical contact with the enwrapped food.

Investigations have further revealed that the primer may be applied directly to the normally treated commercial film without a flame or electric surface treatment, but the results indicate definitely that the combination of both add materially to the adhesive qualities. It is preferred to keep the total solids content of the primer very low, and to lay down an almost monomolecular layer, as an over application of the primer does not add to the adhesive qualities.

The physical aspects, such as film gauge, density, coating weight and surface treatment were next investigated. It was found that the coating weight exhibited an optimum at approximately one pound of lacquer per ream of film on commercially treated film. A ream is defined as the area (one side only) of 500 sheets measuring 24" x 36", or 3000 sq. ft. An application of coating above the optimum amount tends to strip off the film surface, and coatings below ⅔ lb. per ream do not provide enough adhesive for a good seal. This was found to be true regardless of gauge or density of the film. Various techniques were investigated to provide optimum anchorage of the lacquer. As a basic example, the lacquer was applied at one pound per ream over a primer wash on 1.5 mils, low density, polyethylene. The film was commercially obtained with one surface electronically or flame treated, as received. The opposite side was electrically treated and the lacquer was applied directly to one sample, whereas the other samples had the primer applied before the lacquer coating. The test results of a heat seal made at a sealing temperature of 190° F. of a surface i of one sample being in surface-to-surface contact with a surface ii of another sample were as follows:

TABLE I

| | Surface i | | | Surface ii | | | |
|---|---|---|---|---|---|---|---|
| | Treatment Example | Primer | Lacquer | Treatment Example | Primer | Lacquer | Seal, gms./in. |
| 1 | Commercial | No | Yes | Commercial | No | Yes | 20 |
| 2 | do | Yes | Yes | do | Yes | Yes | 190 |
| 3 | do | Yes | Yes | Electrostatic (high voltage) | No | No | 170 |
| 4 | Electrostatic (normal voltage), approx. 3,000 volts. | Yes | Yes | Electrostatic (normal voltage) | Yes | Yes | 210 |
| 5 | Electrostatic (high voltage), approx. 6,000 volts. | Yes | Yes | Electrostatic | Yes | Yes | 440 |

The method of expressing seal strength in the above and following tables will be understood when the manner of making and testing the seals is described, as follows: First, the test sample sheets to be sealed together are each cut to a dimension of 2″ x 6″. The sheets are then superimposed throughout their area with the seal-test surfaces i and ii being in contact with one another. The superimposed sheets are then sealed together for about 4″ of their length by means of a conventional Palo sealer. This sealer is a device arranged for passing the sheets over a 2½″ diameter cylinder heated to 190° F. at a rate of 2 ft./minute at an angle of about 155°, under a vertical load of 200 grams. After the seal has cooled, the unsealed end portions of the sheets are each clamped in the jaws of a seal strength tester, such as the type identified by the trademark "Amthor". The total force required to peel the seal apart along the 2″ width of the strip is thus determined. The seal strength is then reported in terms of gms./linear inch measured along the line of seal separation.

From Table I it will be apparent that there is an increase in seal strength provided by the under priming; 20 grams per inch (Example 1) vs. 190 grams per inch (Example 2). An increase in voltage to about 6000 volts, as shown in the comparison of Examples 4 and 5, indicates a decided increase in seal strength. The electronic treatment makes a better seal even when no lacquer is applied, as is evidenced by the 170 grams per inch seal when a lacquered, commercially treated film is sealed to an unlacquered, high voltage treated film (Example 3). With a commercially treated film or an untreated film, no bond could be made with the lacquered film used in the above sample. A normal voltage of approximately 3000 volts treatment is comparable with the flame treating process. Both of these treatments yield bond strength 50% lower than the high voltage treated film.

As previously stated in the case of providing bread wrappers, we are concerned with the seal on both the inside of the folds and sealing of the folds together, in addition to forming a bottom seal.

The density of the film also becomes important in the case of bread wrapping, as a medium density polyethylene will have a higher melting point than the low density type, and consequently is less apt to "burn through" on the heated plates of the bread wrapping machine. Table II reviews the differences encountered with a number of variables.

inch (Example 6), whereas when primer is applied alone, the seal is 80 grams per inch (Example 8). When the lacquer is used alone, the seal is 70 grams per inch (Example 7). In the case of the bottom seal, where the primer and lacquer are applied to one side of the film and sealed to a primed surface, the seal was found to be 280 grams per inch (Example 9). And, if the surface is not primed, the seal was found to be 245 grams per inch (Example 10). In the case of the low and medium density polyethylene films, both provided seals of the same magnitude, so either may be used for the purpose. Since the seals on primed and lacquered low and medium density polyethylene are similar in range, it is advantageous to use the medium density polyethylene with its higher softening point and subsequent greater resistance to heat and "burn." Another alternative would be the use of a higher gauge low density polyethylene, which would decrease heat sensitivity and also aid in machinability.

Variations in the strength of the primer were next investigated. As may be seen from Table II, the primer by itself, exhibited some seal strength; 80 grams per inch on a high voltage treated surface (Example 8), and 105 grams per inch, on a normal voltage treated surface (Example 13) for low density films, and 130 grams per inch on high voltage treated (Example 16), whereas a seal of only 15 grams per inch was obtained on normal voltage treatment of a medium density film.

The effect of applying various concentrations of primer to normal treated surfaces may be seen from the following table:

TABLE III

| Primer—Polyethylene Imine in Isopropyl Alcohol | Seal Strength | |
|---|---|---|
| | To Itself, gms./in. | To Unprimed Highly Treated Side gms./in. |
| 0.10% | 120 | 90 |
| 0.50% | 170 | 160 |
| 1.00% | 225 | 250 |
| 2.00% | 125 | |
| 3.00% | 95 | |

TABLE II

LOW DENSITY POLYETHYLENE FILM (1 MIL), DOW 42.0111 RESIN

| | Surface i | | | Surface ii | | | | |
|---|---|---|---|---|---|---|---|---|
| | Surface Treatment Example | Primer | Lacquer | Surface Treatment Example | Primer | Lacquer | Bread Fold | Seal (gm./in.) |
| 6 | High Voltage | Yes | Yes | High Voltage | Yes | Yes | Inside of folds | 440 |
| 7 | do | No | Yes | do | No | Yes | do | 70 |
| 8 | do | Yes | No | do | Yes | No | Outside of folds | 80 |
| 9 | do | Yes | Yes | Normal Voltage | Yes | No | Bottom | 280 |
| 10 | do | Yes | Yes | do | No | No | do | 245 |
| 11 | Normal Voltage | Yes | Yes | do | Yes | Yes | Inside of folds | 210 |
| 12 | do | No | Yes | do | No | Yes | do | 260 |
| 13 | do | Yes | No | do | Yes | No | Outside of folds | 105 |

MEDIUM DENSITY POLYETHYLENE FILM (1 MIL), DOW 4206.1 RESIN

| | Surface Treatment Example | Primer | Lacquer | Surface Treatment Example | Primer | Lacquer | Bread Fold | Seal (gm./in.) |
|---|---|---|---|---|---|---|---|---|
| 14 | High Voltage | Yes | Yes | High Voltage | Yes | Yes | Inside of folds | 380 |
| 15 | do | No | Yes | do | No | Yes | do | 140 |
| 16 | do | Yes | No | do | Yes | No | Outside of folds | 130 |
| 17 | do | Yes | Yes | Normal Voltage | Yes | No | Bottom | 365 |
| 18 | do | Yes | Yes | do | No | No | do | 305 |
| 19 | Normal Voltage | Yes | Yes | do | Yes | Yes | Inside of folds | 65 |
| 20 | do | No | Yes | do | No | Yes | do | 15 |
| 21 | do | Yes | No | do | Yes | No | Outside of folds | 15 |

From Table II, above, it will be apparent that by using both the primer and lacquer on the high voltage treated side, there will be provided the strongest seal. Film treated in this manner seals to itself to give a seal of 440 grams per inch (Example 6) as compared to 210 grams per inch on the normal voltage treated commercial stock (Example 11). If both the primer and the lacquer are used in conjunction, they yield a seal of 440 grams per Higher concentrations than 3% were found to be needed in actual press application using rubber rolls to obtain the optimum amount of application. This optimum amount was judged during press runs by using an acid-base indicator, brom-thymol blue.

It will be apparent that the present invention may also embody a wrapper wherein the lacquer is used as a vehicle for printing inks in sufficient ink coverage to provide sealing in only the printed areas, which is otherwise known as thermospat application.

The present invention provides a further improvement in the case of composite wrappers such as those disclosed in the co-pending application of Rosen et al., Serial No. 683,730, filed September 13, 1957, for Art of Packaging, and assigned to the same assignee as is the present invention. Thus, as shown in FIG. 5, the polyethylene film may be used as a center section, or window 40, protected against mechanical contact while sliding against heat sealing side or end plates. One or more paper or regenerated cellulose end supports 41 may be glued on to a polyethylene sheet or the polyethylene may be extruded on to the supporting non-thermoplastic strip in accordance with the teachings of the said co-pending application. The bottom over-lap may be sealed by using any of the above-mentioned techniques for obtaining the polyethylene sealing. The wrapper will thus seal on the bottom, as stated above. The sides of the window 40 will be sealed by conventional gluing techniques to the spaced end supports 41. The end supports 41 are folded and sealed at their outer margins in the usual manner. A finished and wrapped commodity, such as bread, made in accordance with this practice is shown in FIG. 5. This particular embodiment permits an economical wrapper fully adaptable to standard wrapping machines and would eliminate the required attachments of the co-pending application for providing the bottom seal.

It will be apparent that the present invention has provided an improved packaging material and method of preparing the surface or surfaces thereof for enhanced printing and heat sealing characteristics, wherein the preparation takes place in line on a conventional printing press as a part of the printing procedure and thereby provides a means of preparing opposite sides thereof for increased heat seal properties concurrently with conventional printing procedures.

We desire it to be understood that this invention is not to be limited to any particular form or arrangement of parts except in so far as such limitations are included in the appended claims.

We claim:

1. The process for providing a heat sealing surface for a web of polyolefin packaging material comprising the steps of (1) subjecting both surfaces of said web to an oxidizing surface treatment to provide increased active adhesive sites thereon, (2) applying an adhesion-promoting primer coating to one of said treated surfaces to promote the adhesion of the subsequently-applied heat sealable lacquer, said primer coating including a compound selected from the group consisting of polyethylene imine and organic titanium compounds, (3) coating said primed surface with a non-blocking heat sealable lacquer which has a sealing temperature less than the softening temperature of said web of polyolefin material and which is heat sealable to the other surface of said web, (4) drying said heat sealable lacquer coating, and (5) winding said coated web into roll-form.

2. The process for providing a heat sealing surface for a web of polyolefin packaging material comprising the steps of (1) subjecting both surfaces of said web to an oxidizing surface treatment to provide increased active adhesive sites thereon, (2) applying an adhesion-promoting primer coating to one of said treated surfaces to promote the adhesion of the subsequently-applied heat sealable lacquer, said primer coating including a compound selected from the group consisting of polyethylene imine and organic titanium compounds, (3) coating said primed surface with a non-blocking heat sealable lacquer which has a sealing temperature less than the softening temperature of said web of polyolefin material and which is heat sealable to the other surface of said web, said lacquer comprising an admixture of nitrocellulose, the condensation product of a member selected from the group consisting of dimerized and trimerized unsaturated fatty acids of vegetable oils with ethylene diamine, and an anti-blocking compound, (4) drying said heat sealable lacquer coating, and (5) winding said coated web into roll-form.

3. The process for providing a heat sealing surface for a web of polyolefin packaging material comprising the steps of (1) subjecting both surfaces of said web to an oxidizing surface treatment to provide increased active adhesive sites thereon, (2) applying an adhesion-promoting primer coating to one of said treated surfaces to promote the adhesion of the subsequently-applied heat sealable lacquer, said primer coating including a compound selected from the group consisting of polyethylene imine and organic titanium compounds, (3) coating said primed surface with a non-blocking heat sealable lacquer which has a sealing temperature less than the softening temperature of said web of polyolefin material and which is heat sealable to the other surface of said web, said lacquer comprising an admixture of nitrocellulose, the condensation product of a member selected from the group consisting of dimerized and trimerized unsaturated fatty acids of vegetable oils with ethylene diamine, and a fatty acid amide anti-blocking compound, (4) drying said heat sealable lacquer coating, and (5) winding said coated web into roll-form.

4. The process for providing a heat sealing surface for a web of polyolefin packaging material comprising the steps of (1) subjecting both surfaces of said web to an oxidizing surface treatment to provide increased active adhesive sites thereon, (2) applying an adhesion promoting primer coating to one of said treated surfaces to promote the adhesion of the subsequently-applied heat sealable lacquer, said primer coating including a compound selected from the group consisting of polyethylene imine and organic titanium compounds, (3) coating said primed surface with a non-blocking heat sealable lacquer which has a sealing temperature less than the softening temperature of said web of polyolefin material and which is heat sealable to the other surface of said web, said lacquer comprising an admixture of nitrocellulose, the condensation product of a member selected from the group consisting of dimerized and trimerized unsaturated fatty acids of vegetable oils with ethylene diamine, and a mixture of hexadecanamide, octadecanamide and 9-octadecenamide in a suitable solvent, (4) drying said heat sealable lacquer coating, and (5) winding said coated web into roll-form.

5. A plastic, heat sealable packaging material comprising, in combination:

(1) a web of polyolefin material including two treated surfaces providing oxidized active adhesive sites;
(2) an adhesion-promoting primer coating on one of said treated surfaces to promote the adhesion of the subsequently-applied heat sealable lacquer coating, said primer coating including a compound selected from the group consisting of polyethylene imine and organic titanium compounds; and
(3) a coating of non-blocking heat sealable lacquer over said primer coating, said lacquer having a sealing temperature less than the softening temperature of the web of polyolefin material and being heat scalable to the other surface of the web.

6. A plastic, heat sealable packaging material as defined in claim 5 wherein said heat sealable lacquer coating comprises an admixture of nitrocellulose, the condensation product of a member selected from the group consisting of dimerized and trimerized unsaturated fatty acids of vegetable oils with ethylene diamine, and an anti-blocking compound.

7. A plastic, heat sealable packaging material as defined in claim 5 wherein said heat sealable lacquer coating comprises an admixture of nitrocellulose, the condensation product of a member selected from the group consisting of dimerized and trimerized unsaturated fatty acids of vegetable oils with ethylene diamine, and a fatty acid amide anti-blocking compound.

8. A plastic, heat sealable packaging material as defined in claim 5 wherein said heat sealable lacquer coating comprises an admixture of nitrocellulose, the condensation product of a member selected from the group consisting of dimerized and trimerized unsaturated fatty acids of vegetable oils with ethylene diamine, and a mixture of hexadecanamide, octadecanamide and 9-octadecenamide in a suitable solvent.

9. In the process of printing a surface of a continuously moving web of polyethylene material, the combination with in-line surface conditioning steps for enhancing the printing and heat sealing surface characteristics of said web, comprising the steps of subjecting the opposite surfaces of said web to the influence of an oxidizing electric arc to provide increased active adhesive sites thereon, applying a primer coating to one of said surfaces, said primer coating comprising polyethylene imine, printing an area of said primed surface and applying a heat sealable lacquer coating to said primed surface, said lacquer coating comprising an admixture of nitrocellulose, the condensation product of dimerized or trimerized unsaturated fatty acids of vegetable oils with ethylene diamine, and a mixture of hexadecanamide, octadecanamide and 9-octadecenamide in a suitable solvent.

References Cited in the file of this patent

UNITED STATES PATENTS

| | | |
|---|---|---|
| 2,502,770 | Watson | Apr. 4, 1950 |
| 2,589,424 | Netschert | Mar. 18, 1952 |
| 2,689,800 | Horback et al. | Sept. 21, 1954 |
| 2,736,427 | Trombetta | Feb. 28, 1956 |
| 2,738,056 | Heller | Mar. 13, 1956 |
| 2,859,480 | Berthold et al. | Nov. 11, 1958 |
| 2,907,675 | Gaylord | Oct. 6, 1959 |
| 2,928,756 | Campbell | Mar. 15, 1960 |
| 2,968,576 | Keller et al. | Jan. 17, 1961 |

FOREIGN PATENTS

| | | |
|---|---|---|
| 209,644 | Australia | Aug. 12, 1956 |

OTHER REFERENCES

Oil & Soap, vol. 21, pages 101–107, April 1944.
Material Trade Names, Zimmerman and Lavine, page 63, 1953, Industrial Research Service.